Figure 1:
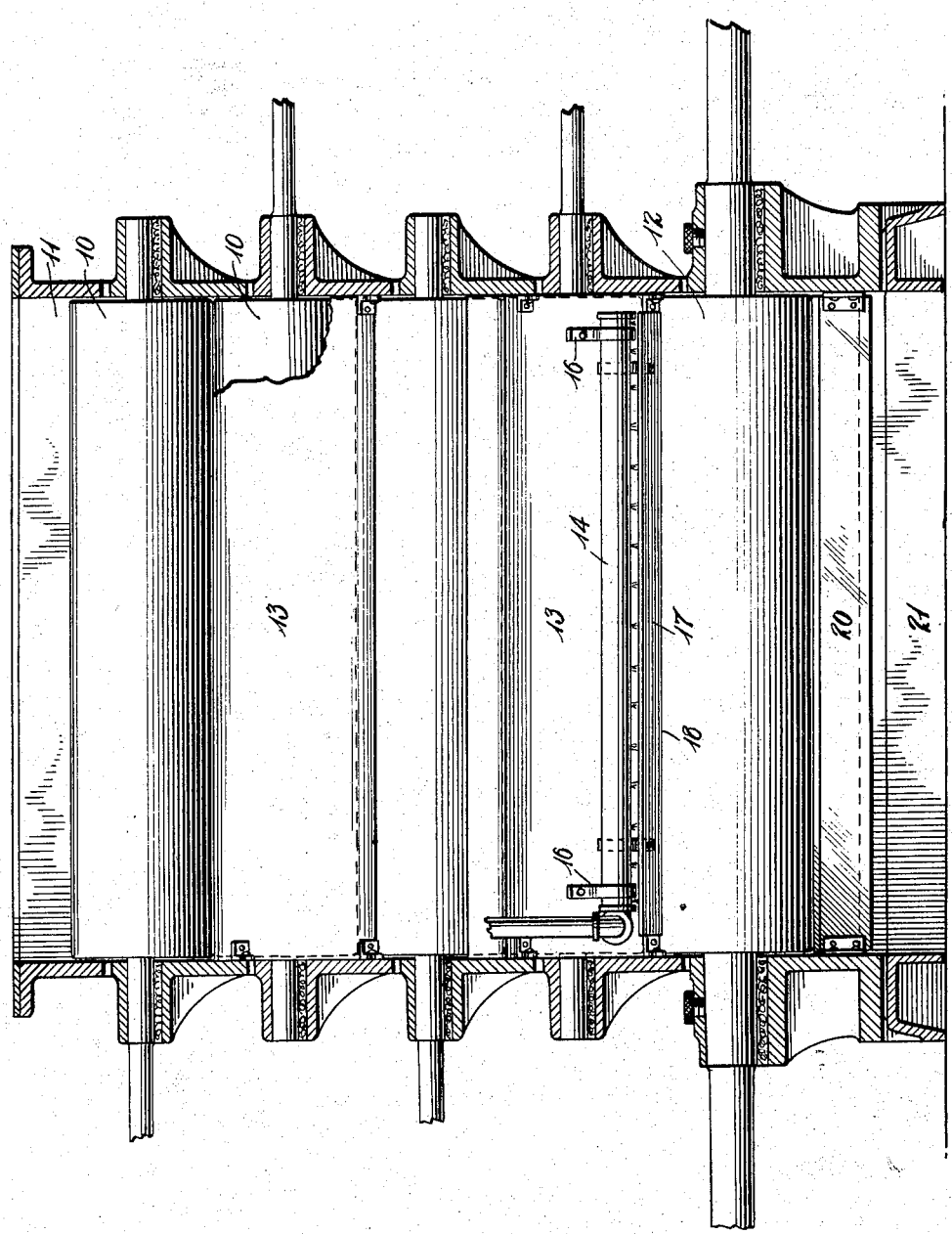

Feb. 25, 1930. M. W. FAHERTY 1,748,933
HUMIDITY CONTROL FOR COOKING HEATERS
Filed Nov. 7, 1923 2 Sheets-Sheet 1

Inventor
M. W. Faherty
By Knight Bros.
Attorneys

Feb. 25, 1930.  M. W. FAHERTY  1,748,933
HUMIDITY CONTROL FOR COOKING HEATERS
Filed Nov. 7, 1923   2 Sheets-Sheet 2
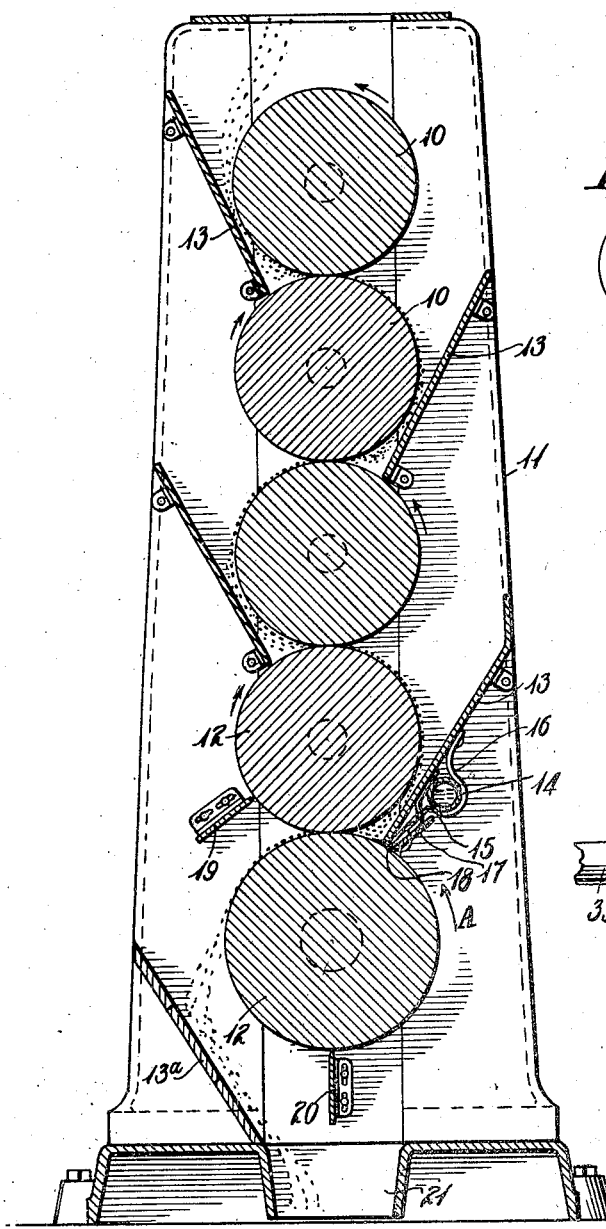
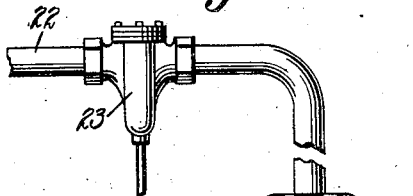
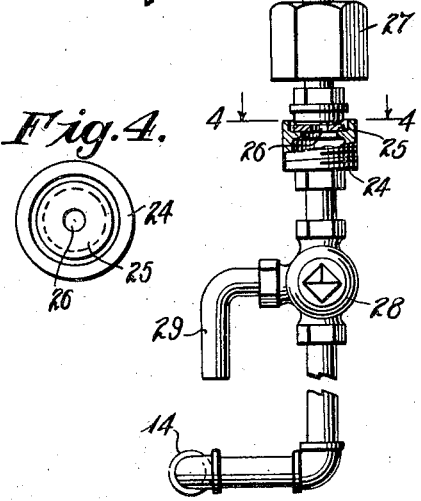
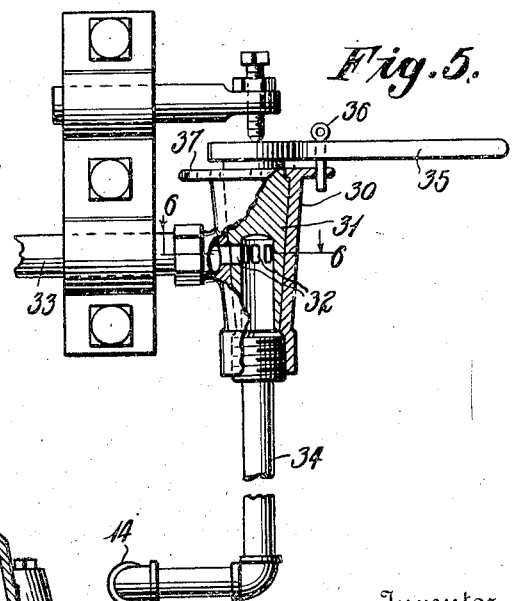
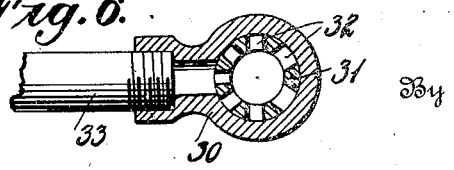
Inventor
M. W. Faherty
By Knight Bro.
Attorneys Patented Feb. 25, 1930

1,748,933

UNITED STATES PATENT OFFICE

MICHAEL W. FAHERTY, OF PHOENIX, ARIZONA

HUMIDITY CONTROL FOR COOKING HEATERS

Application filed November 7, 1923. Serial No. 673,398.

This invention relates to a humidity control for cooking heaters or more specifically to a moisture introducing device particularly adapted for bringing the moisture content of kernels or meats of seed to the proper percentage.

During all the years that kernels or meats of seed have been cooked or heated to facilitate the extraction of oil therefrom, the proper moisture content in the meats has been a very vexing problem. If, for instance, there has been plenty of rainfall previous to the time that cotton is picked, the seed has an excess of moisture. This applies also to all other oil-bearing seeds. Heating of the seed while in storage, preparatory to being manufactured, is a very common result of excess moisture. If the kernels or meats are sent to the press-room containing excess moisture, they cannot be successfully handled in the press-room until after the moisture has been reduced to the proper percentage, such reduction being usually made by heating the meats in the cookers for a longer period than necessary, supplemented by an exhaust fan for removing the vapor as it is generated by the application of heat to the seed. However, when meats are kept in the cookers for a period longer than is required to accomplish the cooking, the oil obtained is dark in color and a very considerable loss results in refining this oil. Another obvious objection to this method of moisture content reduction is that under these conditions less tonnage is put through a mill in a given period of time with a resultant higher labor and production cost.

To overcome the danger of seed heating in storage many mills have adopted the plan of mechanically drying the seed immediately as it comes from the car or wagon. However, such a plan causes difficulty at a later period when the meats must have moisture added thereto for proper cooking.

In some of the Western States where there is very little rainfall the seed is always lacking in sufficient moisture for cooking. For an example, when there is less than 6% moisture in meats, additional moisture must be added and when the moisture content is in excess of 9% when the meats enter the cooker, some of it must be removed before the meats are put in the presses to extract the oil. In practically every mill in all parts of the country seed is received which does not have sufficient moisture content or has too great a moisture content. However, the periods of deficiency in moisture are of longer duration so that during the greater part of each year moisture must be added to the meats.

In all hydraulic oil mills the kernels or meats are pressed between rolls preliminary to cooking and it is a known fact that better results in rolling and a greater yield of oil is obtained if the meats have a proper moisture content before being rolled. In every case, however, where a mechanical introduction of moisture has been attempted in advance of the rolls, failure has attended the efforts. This failure is invariably the result of unequal distribution of the moisture which causes considerable trouble at the rolls due to the fact that the portions of meats containing an excess moisture cling to the cant boards or diverging boards, and in a short time, a complete choking of an entire set of rolls may result. It may be safely stated that every mill engineer of any considerable length of service has at some time endeavored to moisten the meats in advance of the rolls and in every case has met with failure and abandoned the plan.

Numerous efforts have been made to introduce moisture in the meats at some point during their passage from the rolls to the cookers. Also numerous attempts have been made to introduce moisture into the meats after they have entered the cookers. However, all these have proven inefficient, unsatisfactory and objectionable as heretofore no method has been devised whereby this additional moisture may be uniformly applied to the meats at the proper stage of their manufacture.

It should be remembered that persons skilled in this particular art have always been cognizant of the fact that the best results in cooking and yield of oil were obtained when the meats had the correct amount of moisture present at the time they passed through the crushing rolls. When moistened the kernels offer less resistance to thorough crushing and disruption of the oil cells, which, when accomplished at the rolls, makes for greater efficiency in the subsequent process of cooking. Natural moisture content in proper quantity is usually present only for a short period following the beginning of each season. In some sections of the country as above noted, the seeds have at no time the proper natural moisture content so that for efficiency in production, moisture must be added at all times. It is furthermore generally admitted that an average loss of at least two gallons of oil per ton of seed results because of, first: too much moisture at times, and second; insufficient moisture at other times.

From the above, it will be apparent that there is an urgent need for a system that will insure the meats having exactly the same and proper amount of moisture content at all times, irrespective of the climatic conditions and amount of rainfall.

The crushing rolls in practically all oil mills for crushing various kinds of oil-bearing seeds and kernels are usually five high and of varying diameters and length, dependent upon the required capacity. The rolls are in direct contact one with the other and rest upon and are supported by the bottom roll. Obviously with an arrangement of this character the greatest crushing effect upon the meats takes place during their passage between the two bottom rolls. The maximum and most efficient crushing effect occurs at this point for two reasons. First, because the meats during their travel three times between the upper rolls are partially prepared by the cross-sectional area of the kernels being increased and they being crushed to a flaky condition, and secondly, because the greatest pressure per inch of projected area occurs between the two bottom rolls, this resulting from the combined weights of all the rolls above the bottom one.

With a thorough knowledge of the above facts and with a comprehensive knowledge of the requirements necessary for efficiency in production, I have discovered that, first; moisture must be put in the meats as they pass through the rolls, second; that there is but one point in the passage of the meats between the rolls where moisture may be introduced with no disturbing after effects, and third; a means of distributing moisture so that each particle of meats will receive the same amount and, in any desired quantity. This latter is of supreme importance in obtaining the maximum oil yield through uniform cooking of the meats; incidentally it also greatly minimizes the formation of "water balls" in the cooking chambers and the oil cakes are, after pressing, uniform throughout in density and color.

My invention therefore resides broadly in the discovery of the practical, most satisfactory and efficient point during the manufacture of the seed for applying moisture content thereto, together with a practical embodiment of this discovery for satisfactory adaptation in use.

With the knowledge obtained by my invention as above described, the scope of the same may be broadened by utilizing this knowledge in connection with a system of overcoming and eliminating the inefficiency in production resulting from fluctuations of moisture content of the meats as they enter the cookers. Such fluctuation now occurs daily, and even hourly, with no known way for the operators of positively ascertaining when seed of improper moisture content is being placed in the rolls and cookers.

This desired constancy of moisture content may be positively assured by passing all the meats as they come from the hulling and separating machinery through a drier immediately in advance of their entrance to the rolls to be crushed. All the meats could, for instance, be reduced to say, 6% moisture content and for the purpose of illustration, it will be assumed that all the meats should have a 7% moisture content when they enter the cookers. Inasmuch as the weight of the meats passing through the rolls is practically constant in a mill of a given capacity, it would be practical, with my invention as previously described, to introduce a given weight of fluid in a given time. The fluid employed would be sufficient to add the 1% moisture required. Thus, all the seed, irrespective of this moisture content previously present, would, as it entered the cookers, have a uniform moisture content of a proper amount.

One mechanical adaptation of my invention will be described herein in some detail and also illustrated in the drawing as well as an obvious modification of one detail thereof, but as this description proceeds, it will be apparent that the mechanical constructions illustrated in the drawing are solely for the purpose of disclosing a concrete example of the invention and application.

In the drawings:

Fig. 1 is a sectional view partly in elevation, of a set of five high rollers such as is customarily employed in hydraulic oil mills, with my invention attached, Fig. 2 is a vertical longitudinal sectional view through the structure illustrated in Fig. 1, Fig. 3 is a detail view partly in section of means for controlling the fluid, Fig. 4 is a detail sectional view taken substantially on the plane indicated by line 4—4 in Fig. 3, Fig. 5 is a fragmentary view partly in section indicating a modified form of the means for controlling the fluid, and, Fig. 6 is a fragmentary detail sectional view taken substantially on the plane indicated by line 6—6 in Fig. 5.

Referring now particularly to the drawings wherein like reference characters indicate like parts, it will be noted that there is illustrated a set of crushing rolls 10, 12, preferably five high and of the type customarily employed in oil mills, the diameter and length of the rolls being dependent on the required capacity of the mill. As is customary these rolls are contained in a housing 11 and arranged in superposed relation, resting one upon the other and being relatively slidable, with the result that between the bottom rolls 12 the maximum crushing effect on the seed occurs.

These rolls may be driven in any suitable and practical manner and as this forms no part of my invention, the driving means will not be referred to nor illustrated in detail. Associated with the several rolls are the usual cant boards 13, these boards diverting or guiding the meats between the rolls as will be apparent.

Preferably secured to the lowermost cant board 13 is a pipe 14 provided with a plurality of perforations 15, this spray pipe being supported for instance, by brackets 16 so that the liquid may be ejected therefrom and caused to impinge against the under face of this cant board and thus be spread before being discharged into engagement with the meats. A plate 17 arranged in an inclined position with respect to the lowermost cant board 13, forms together with this cant board, a tapered hopper having a base forming a restricted opening 18 slightly separated from the lowermost roll.

Owing to the proximity of the point of discharge of the liquid with the surface of the lowermost roll, this roll receives all of the liquid discharged and carries the same in its direction of rotation indicated by arrow A in Fig. 2. This permits of the liquid being intimately and uniformly applied and mixed with the meats passing through the two lowermost rolls 12. It will be remembered that as previously pointed out, the maximum or greatest pressure per square inch upon the meats occurs between the two lowermost rolls and furthermore that the condition of the meats because of their previous passage between the upper rolls is most advantageous at this lower point for addition of this moisture.

Extra scrapers 19 and 20 may be provided to keep the rolls entirely clean of such material as may be inclined to adhere to the faces thereof. The material after passing between the last pair of rolls falls upon the lowermost cant board 13ª and is discharged through an opening 21 where it is deposited upon a conveyor (not shown) and taken to the cookers.

Obviously, means must be provided for positively and accurately regulating the supply of liquid passing to the spray pipe 14 and while obvious mechanical expedients suggest themselves, still I have found two methods of accomplishing this which are efficient and simple in operation. Referring to Figs. 3 and 4 wherein one arrangement is illustrated it will be noted that the reference character 22 indicates a water supply pipe interposed in which there is a strainer 23 with a perforated screen with holes sufficiently small to protect the apertures 15 formed in the pipe 14. The pipe 22 is also provided with a coupling, the one part 24 of which may be recessed to receive any one of a number of preferably steel-discs 25, each disc being formed with a centrally arranged aperture 26 of different size. A coupling nut 27 may be suitably operated so that when the coupling is disengaged, the desired disc may be inserted thus accurately and positively regulating the amount of water which may be fed to the spray pipe 14. The supply pipe 22 is also preferably provided with a three-way valve 28 and a spout 29 may be provided, where the volume and weight of the liquid passing through the discs 25 and consequently to the spray pipe 14 may be tested.

By referring to Figs. 5 and 6, another mechanical arrangement for positively and accurately gauging the amount of water permitted to flow through the spray pipe 14 will be described. In this arrangement there is provided a valve 30 the plug 31 of which is formed with any number of valve openings 32 of various sizes. In this arrangement the supply pipe is indicated by the reference character 33, with a pipe 34 connected to the spray pipe 14. An operating handle 35 is employed for rotating the valve plug 31, it being possible to lock this handle in any of its adjusted positions by means of a pin 36 engaging any one of a number of apertures provided in a locking flange 37. Obviously the number of apertures arranged in the locking flange 37 will correspond to the number of valve openings 32 so that when the desired adjustment of the valve has been accomplished, the position of the handle will indicate this whereupon the handle can be locked by the insertion of the pin 36. A strainer would also be inserted in the supply pipe 33 for protecting the spray pipe 14.

In either of these two suggested arrangements it will appear that the primary object sought to be accomplished is that of simply, positively and accurately regulating the amount of liquid which is permitted to flow to the spray pipe 14. It will be also immediately obvious that any person skilled in this art may with little difficulty provide other arrangements for accomplishing with equal efficiency the purpose sought. Therefore in this connection it should be understood that these mechanical arrangements herein described are for purposes of illustration only and that I am not limited in any respect to the arrangements therein disclosed.

In operation the material is fed to the rolls 10 at the top thereof through a feeder (not shown) and is dropped to the left of the center of the top roll as shown in Fig. 2 whereupon it slides downwardly on the uppermost cant board and passes between the two upper rolls. By alternately arranging the cant boards, the material is successively engaged by the rolls, the pressure exerted upon the meats obviously increasing until a maximum pressure is obtained between the lowermost rolls 12. Obviously because of the greater crushing moment obtained between the lowermost rolls the moisture is more firmly and uniformly introduced into the meats than would be otherwise possible.

From the foregoing it will be obvious that by means of my invention it is possible to obtain a constant and uniform moisture content in the seeds at all times and inasmuch as the moisture content of seed, is, in most instances, less than that which insures efficient production, the utility of this arrangement is manifestly enhanced. As has been suggested hereinbefore, a method which will insure a constancy of moisture content in all seed may be produced by reducing the moisture content of all seeds to a fixed amount lower than that required, or in other words, to the lowest moisture content of any batch of seed. After this has been accomplished by means of my invention the moisture content of all the seeds may then be raised to that which has been determined most efficient so that irrespective of previous discrepancies in the amount of moisture content in the various batches of seed, the manufacture of the seed may be carried on with the highest degree of efficiency.

I therefore claim as my invention broadly, the introduction of moisture into the meats at the prescribed period during their manufacture.

Having thus described my invention, what I claim is:

1. The method of introducing moisture into oil-bearing meats or kernels, consisting in continuously feeding the meats or kernels onto a surface covered with a uniform film of liquid subjecting them to pressure thereon, discharging them therefrom, and continuously renewing the film of liquid on said surface.

2. The method of introducing moisture into oil-bearing meats or kernels of sub-normal moisture content, consisting in continuously feeding the meats or kernels onto a surface covered with a uniform film of liquid, subjecting them to pressure thereon, discharging them therefrom, and continuously renewing the film of liquid on said surface, the amount of liquid supplied to said surface being regulated so as to raise the moisture content of the meats or kernel substantially to normal.

The foregoing specification signed at Los Angeles, California, this twenty-ninth day of October, 1923.

MICHAEL W. FAHERTY.